United States Patent
Yokozawa et al.

(10) Patent No.: US 10,302,184 B2
(45) Date of Patent: May 28, 2019

(54) BICYCLE COMPONENT, BICYCLE SPROCKET, AND BICYCLE COMPOSITE SPROCKET

(71) Applicant: SHIMANO INC., Sakai (JP)

(72) Inventors: Dai Yokozawa, Sakai (JP); Wataru Yamauchi, Sakai (JP)

(73) Assignee: SHIMANO INC., Sakai (JP)

( * ) Notice: Subject to any disclaimer, the term of this patent is extended or adjusted under 35 U.S.C. 154(b) by 130 days.

(21) Appl. No.: 15/088,410

(22) Filed: Apr. 1, 2016

(65) Prior Publication Data

US 2017/0284528 A1  Oct. 5, 2017

(51) Int. Cl.
*B60B 1/00*    (2006.01)
*B62M 9/00*   (2006.01)
*F16H 55/06*  (2006.01)
*F16H 55/30*  (2006.01)

(52) U.S. Cl.
CPC .............. *F16H 55/06* (2013.01); *B62M 9/00* (2013.01); *B60B 1/003* (2013.01); *B60B 2310/204* (2013.01); *B60B 2310/316* (2013.01); *B60B 2360/104* (2013.01); *B60B 2360/30* (2013.01); *B60B 2360/3416* (2013.01); *B60B 2900/572* (2013.01); *F16H 55/30* (2013.01)

(58) Field of Classification Search
CPC ...... B62M 9/105; B62M 3/00; B22F 2998/00; B22F 9/28; F16H 55/30
USPC .................................. 474/152, 161
See application file for complete search history.

(56) References Cited

U.S. PATENT DOCUMENTS

| | | | | |
|---|---|---|---|---|
| 2,906,008 A * | 9/1959 | Boegehold | ........... | B23K 35/005 228/194 |
| 3,765,954 A * | 10/1973 | Tokuda | .................... | C23C 12/00 148/220 |
| 4,475,894 A * | 10/1984 | Sugino | ................... | B62M 9/105 474/144 |
| 4,806,438 A * | 2/1989 | Hinotani | .............. | B23K 35/005 228/235.3 |
| 5,132,003 A * | 7/1992 | Mitani | ................... | C25D 11/06 205/170 |
| 7,503,864 B2 * | 3/2009 | Nonoshita | .............. | B62M 9/105 474/160 |
| 7,650,818 B2 * | 1/2010 | Inoue | .................... | B60B 27/023 464/181 |
| 7,824,287 B2 * | 11/2010 | Nonoshita | ................ | B62M 9/10 474/152 |
| 7,850,564 B2 * | 12/2010 | Nonoshita | .............. | B62M 9/105 474/152 |
| 7,967,709 B2 * | 6/2011 | Emura | ................... | B62M 9/105 474/160 |
| 8,616,085 B2 * | 12/2013 | Nonoshita | ................ | B62M 3/00 74/594.2 |
| 9,359,042 B2 * | 6/2016 | Nonoshita | ................ | B62M 3/00 |
| 9,476,137 B2 * | 10/2016 | Ohmi | ..................... | C25D 11/06 |
| 9,540,070 B2 * | 1/2017 | Watarai | ................... | B62M 9/02 |

(Continued)

FOREIGN PATENT DOCUMENTS

DE    20 2017 000 312 U1    4/2017

*Primary Examiner* — Henry Y Liu

(74) *Attorney, Agent, or Firm* — Mori & Ward, LLP

(57) ABSTRACT

A bicycle component comprises a base member and a first alumite layer. The base member is made of an aluminum alloy. The first alumite layer is provided on the base member. The first alumite layer has a thickness that is equal to or larger than 1.0 μm.

30 Claims, 17 Drawing Sheets

(56) References Cited

U.S. PATENT DOCUMENTS

| | | | | |
|---|---|---|---|---|
| 2004/0261912 A1* | 12/2004 | Wu | C22C 14/00 | 148/421 |
| 2005/0032596 A1* | 2/2005 | Nonoshita | B62K 19/16 | 474/175 |
| 2005/0282672 A1* | 12/2005 | Nonoshita | B62M 9/105 | 474/161 |
| 2006/0128512 A1* | 6/2006 | Tetsuka | B62M 3/00 | 474/160 |
| 2006/0205549 A1* | 9/2006 | Nonoshita | B62M 9/105 | 474/160 |
| 2007/0129193 A1* | 6/2007 | Nonoshita | B62M 9/105 | 474/160 |
| 2007/0241530 A1* | 10/2007 | Nonoshita | B62M 3/00 | 280/259 |
| 2007/0265122 A1* | 11/2007 | Emura | B62M 9/105 | 474/152 |
| 2008/0202284 A1* | 8/2008 | Valle | B62M 3/00 | 74/594.1 |
| 2008/0224440 A1* | 9/2008 | Masuda | B62M 3/00 | 280/259 |
| 2008/0238029 A1* | 10/2008 | Inoue | B60B 27/023 | 280/281.1 |
| 2008/0292488 A1* | 11/2008 | Woodfield | B22F 1/02 | 419/63 |
| 2011/0151998 A1* | 6/2011 | Ban | A63B 53/047 | 473/331 |
| 2012/0042746 A1* | 2/2012 | Nonoshita | B62M 3/00 | 74/594.2 |
| 2012/0263619 A1* | 10/2012 | Woodfield | B22F 1/02 | 419/63 |
| 2013/0087013 A1* | 4/2013 | Sugimoto | B62M 9/105 | 74/594.2 |
| 2014/0047947 A1* | 2/2014 | Nonoshita | B62M 3/00 | 74/594.1 |
| 2014/0196569 A1* | 7/2014 | Nonoshita | B62M 3/00 | 74/594.2 |
| 2014/0335986 A1* | 11/2014 | Iwai | B62M 9/105 | 474/155 |
| 2014/0335987 A1* | 11/2014 | Iwai | B62M 9/10 | 474/161 |
| 2014/0338494 A1* | 11/2014 | Sugimoto | B62M 1/36 | 74/594.2 |
| 2015/0000459 A1* | 1/2015 | Nonoshita | B62K 19/16 | 74/594.1 |
| 2015/0093595 A1* | 4/2015 | Asakawa | C10M 107/38 | 428/640 |
| 2015/0094179 A1* | 4/2015 | Iwai | F16H 55/30 | 474/152 |
| 2015/0210353 A1* | 7/2015 | Tokuyama | B62M 9/12 | 474/160 |
| 2015/0217834 A1* | 8/2015 | Iwai | B62M 9/105 | 474/152 |
| 2016/0017772 A1* | 1/2016 | Asahi | C25D 11/04 | 123/90.17 |
| 2016/0265474 A1* | 9/2016 | Niimi | F02F 3/10 | |
| 2016/0347409 A1* | 12/2016 | Watarai | B62M 9/02 | |

\* cited by examiner

BICYCLE COMPONENT, BICYCLE
SPROCKET, AND BICYCLE COMPOSITE
SPROCKET

BACKGROUND OF THE INVENTION

Field of the Invention

The present invention relates to a bicycle component, a bicycle sprocket, and a bicycle composite sprocket.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

SUMMARY OF THE INVENTION

In accordance with a first aspect of the present invention, a bicycle component comprises a base member and a first alumite layer. The base member is made of an aluminum alloy. The first alumite layer is provided on the base member. The first alumite layer has a thickness that is equal to or larger than 1.0 μm.

With the bicycle component according to the first aspect, it is possible to give sufficient electrical insulation property to the first alumite layer. Thus, it is possible to provide the bicycle component on which a colored alumite layer can be formed even if the bicycle component is combined with a non-metallic material having electrical conductivity.

In accordance with a second aspect of the present invention, the bicycle component according to the first aspect is configured so that the thickness of the first alumite layer is equal to or larger than 2.5 μm.

With the bicycle component according to the second aspect, it is possible to further improve the electrical insulation property of the first alumite layer. This allows the colored alumite layer to be more easily formed on the bicycle component.

In accordance with a third aspect of the present invention, the bicycle component according to the first or second aspect is configured so that the thickness of the first alumite layer is equal to or larger than 5.0 μm.

With the bicycle component according to the third aspect, it is possible to further improve the electrical insulation property of the first alumite layer. This allows the colored alumite layer to be more easily formed on the bicycle component In accordance with a fourth aspect of the present invention, the bicycle component according to any one of the first to third aspects is configured so that the thickness of the first alumite layer is equal to or larger than 10.0 μm.

With the bicycle component according to the fourth aspect, it is possible to further improve the electrical insulation property of the first alumite layer. This allows the colored alumite layer to be more easily formed on the bicycle component.

In accordance with a fifth aspect of the present invention, the bicycle component according to any one of the first to fourth aspects further comprises a non-metallic member provided on the first alumite layer.

With the bicycle component according to the fifth aspect, it is possible to provide a bicycle composite component including the aluminum alloy and the non-metallic material while the colored alumite layer can be sufficiently formed on the bicycle component.

In accordance with a sixth aspect of the present invention, the bicycle component according to the fifth aspect is configured so that the non-metallic member has electrical conductivity.

With the bicycle component according to the sixth aspect, it is possible to provide a bicycle composite component including the aluminum alloy and the non-metallic material having the electrical conductivity while the colored alumite layer can be sufficiently formed on the bicycle component.

In accordance with a seventh aspect of the present invention, the bicycle component according to the fifth or sixth aspect is configured so that the non-metallic member is made of a carbon fiber reinforced plastic.

With the bicycle component according to the seventh aspect, it is possible to provide a bicycle composite component including the aluminum alloy and the light carbon fiber reinforced plastic having high mechanical strength while the colored alumite layer can be sufficiently formed on the bicycle component.

In accordance with an eighth aspect of the present invention, the bicycle component according to any one of the fifth to seventh aspects is configured so that the non-metallic member is made of conductive resin.

With the bicycle component according to the eighth aspect, it is possible to provide a bicycle composite component including the aluminum alloy and the non-metallic member made of conductive resin while the colored alumite layer can be sufficiently formed on the bicycle component.

In accordance with a ninth aspect of the present invention, the bicycle component according to any one of the first to eighth aspects further comprises a second alumite layer provided on the base member.

With the bicycle component according to the ninth aspect, it is possible to provide a bicycle composite component including the second alumite layer used as a colored alumite layer in addition to the first alumite layer having electrical insulation property.

In accordance with a tenth aspect of the present invention, the bicycle component according to the ninth aspect further comprises dye compound fixed to the second alumite layer.

With the bicycle component according to the tenth aspect, it is possible to provide a bicycle composite component including the second alumite layer dyed with the dye compound in addition to the first alumite layer having electrical insulation property.

In accordance with an eleventh aspect of the present invention, a bicycle sprocket comprises the bicycle component according to any one of the first tenth aspects.

With the bicycle component according to the eleventh aspect, it is possible to give sufficient electrical insulation property to the first alumite layer. Thus, it is possible to provide the bicycle sprocket on which a colored alumite layer can be formed even if the bicycle component is combined with a non-metallic material having electrical conductivity.

In accordance with a twelfth aspect of the present invention, a bicycle composite sprocket comprises the bicycle component according to any one of the fifth to tenth aspects.

With the bicycle component according to the twelfth aspect, it is possible to give sufficient electrical insulation property to the first alumite layer. Thus, it is possible to provide the bicycle composite sprocket on which a colored alumite layer can be formed even if the bicycle component is combined with a non-metallic material having electrical conductivity.

In accordance with a thirteenth aspect of the present invention, a bicycle wheel comprises the bicycle component according to any one of the fifth to tenth aspects.

With the bicycle component according to the thirteenth aspect, it is possible to give sufficient electrical insulation property to the first alumite layer. Thus, it is possible to provide the bicycle wheel on which a colored alumite layer can be formed even if the bicycle component is combined with a non-metallic material having electrical conductivity.

In accordance with a fourteenth aspect of the present invention, the bicycle component according to any one of the fifth to tenth aspects is configured so that the non-metallic member includes resin. The non-metallic member is attached to the base member via the first alumite layer by an integral molding process.

With the bicycle component according to the fourteenth aspect, the integral molding process improves productivity of the bicycle component. Thus, it is possible to provide a bicycle composite component which is preferable for a high-volume production and in which the non-metallic member certainly adheres to an aluminum base material.

In accordance with a fifteenth aspect of the present invention, the bicycle component according to any one of the seventh to fourteenth aspects is configured so that the non-metallic member includes resin. The non-metallic member is attached to the base member via the first alumite layer by a thermal compression bonding process.

With the bicycle component according to the fifteenth aspect, it is possible to provide a bicycle composite component in which the nom-metallic material made of a prepreg material certainly adheres to an aluminum base material.

In accordance with a sixteenth aspect of the present invention, the bicycle component according to any one of the ninth to fifteenth aspects is configured so that the first alumite layer is provided on the base member in a first area. The second alumite layer provided on the base member in a second area different from the first area.

With the bicycle component according to the sixteenth aspect, the first alumite layer has sufficient electrical insulation property. Thus, it is possible to provide an aluminum base material that allows a colored alumite layer to be able to be formed as the second alumite layer disposed at a different location from the first alumite layer even if the bicycle component is combined with a non-metallic material having electrical conductivity.

In accordance with a seventeenth aspect of the present invention, a bicycle component comprises a base member and a first alumite layer. The base member is made of an aluminum alloy. The first alumite layer is provided on the base member. The first alumite layer has electrical resistance that is equal to or higher than $10^3 \Omega$.

With the bicycle component according to the seventeenth aspect, because of the first alumite layer having the high electrical resistance, it is possible to provide an aluminum base material on which a colored alumite layer can be formed even if the bicycle component is combined with a non-metallic material having electrical conductivity.

In accordance with an eighteenth aspect of the present invention, the bicycle component according to the seventeenth aspect is configured so that the electrical resistance of the first alumite layer is equal to or higher than $10^4 \Omega$.

With the bicycle component according to the eighteenth aspect, it is possible to further improve the electrical insulation property of the first alumite layer. This allows the colored alumite layer to be more easily formed on the bicycle component.

In accordance with a nineteenth aspect of the present invention, the bicycle component according to the seventeenth or eighteenth aspects is configured so that the electrical resistance of the first alumite layer is equal to or higher than $10^5 \Omega$.

With the bicycle component according to the nineteenth aspect, it is possible to further improve the electrical insulation property of the first alumite layer. This allows the colored alumite layer to be more easily formed on the bicycle component.

In accordance with a twentieth aspect of the present invention, the bicycle component according to any one of the seventeenth to nineteenth aspects further comprises a non-metallic member provided on the first alumite layer.

With the bicycle component according to the twentieth aspect, it is possible to provide a bicycle composite component including the aluminum alloy and the non-metallic material while the colored alumite layer can be sufficiently formed on the bicycle component.

In accordance with a twenty-first aspect of the present invention, the bicycle component according to the twentieth aspect is configured so that the non-metallic member has electrical conductivity.

With the bicycle component according to the twenty-first aspect, it is possible to provide a bicycle composite component including the aluminum alloy and the non-metallic material having the electrical conductivity while the colored alumite layer can be sufficiently formed on the bicycle component.

In accordance with a twenty-second aspect of the present invention, the bicycle component according to the twentieth or twenty-first aspect is configured so that the non-metallic member is made of a carbon fiber reinforced plastic.

With the bicycle component according to the twenty-second aspect, it is possible to provide a bicycle composite component including the aluminum alloy and the light carbon fiber reinforced plastic having high mechanical strength while the colored alumite layer can be sufficiently formed on the bicycle component.

In accordance with a twenty-third aspect of the present invention, the bicycle component according to any one of the twentieth to twenty-second aspects is configured so that the non-metallic member is made of conductive resin.

With the bicycle component according to the twenty-third aspect, it is possible to provide a bicycle composite component including the aluminum alloy and the non-metallic member made of conductive resin while the colored alumite layer can be sufficiently formed on the bicycle component.

In accordance with a twenty-fourth aspect of the present invention, the bicycle component according to any one of the seventeenth to twenty-third aspects further comprises a second alumite layer provided on the base member.

With the bicycle component according to the twenty-fourth aspect, it is possible to provide a bicycle composite component including the second alumite layer used as a colored alumite layer in addition to the first alumite layer having electrical insulation property.

In accordance with a twenty-fifth aspect of the present invention, the bicycle component according to the twenty-fourth aspect further comprises dye compound fixed to the second alumite layer.

With the bicycle component according to the twenty-fifth aspect, it is possible to provide a bicycle composite component including the second alumite layer dyed with the dye compound in addition to the first alumite layer having electrical insulation property.

In accordance with a twenty-sixth aspect of the present invention, the bicycle component according to any one of the twentieth to twenty-fifth aspects is configured so that the non-metallic member has electrical resistance lower than the electrical resistance of the first alumite layer.

With the bicycle component according to the twenty-sixth aspect, because of the first alumite layer having the electrical resistance higher than the electrical resistance of the non-metallic material, it is possible to provide an aluminum base material on which a colored alumite layer can be formed even if the bicycle component is combined with a non-metallic material having electrical conductivity.

In accordance with a twenty-seventh aspect of the present invention, a bicycle sprocket comprises the bicycle component according to any one of the seventeenth to twenty-sixth aspects.

With the bicycle component according to the twenty-seventh aspect, because of the first alumite layer having the high electrical resistance, it is possible to provide a bicycle sprocket including an aluminum base material on which a colored alumite layer can be formed even if the bicycle component is combined with a non-metallic material having electrical conductivity.

In accordance with a twenty-eighth aspect of the present invention, a bicycle composite sprocket comprises the bicycle component according to any one of the twentieth to twenty-sixth aspects.

With the bicycle component according to the twenty-eighth aspect, because of the first alumite layer having the high electrical resistance, it is possible to provide a bicycle composite sprocket including a composite material on which a colored alumite layer can be formed even if the bicycle component is combined with a non-metallic material having electrical conductivity.

In accordance with a twenty-ninth aspect of the present invention, a bicycle wheel comprises the bicycle component according to any one of the twentieth to twenty-sixth aspects.

With the bicycle component according to the twenty-ninth aspect, it is possible to give sufficient electrical insulation property to the first alumite layer. Thus, it is possible to provide the bicycle wheel on which a colored alumite layer can be formed even if the bicycle component is combined with a non-metallic material having electrical conductivity.

In accordance with a thirtieth aspect of the present invention, the bicycle component according to any one of the twentieth to twenty-sixth aspects is configured so that the non-metallic member includes resin. The non-metallic member is attached to the base member via the first alumite layer by an integral molding process.

With the bicycle component according to the thirtieth aspect, the integral molding process improves productivity of the bicycle component. Thus, it is possible to provide a bicycle composite component which is preferable for a high-volume production and in which the non-metallic member certainly adheres to an aluminum base material.

In accordance with a thirty-first aspect of the present invention, the bicycle component according to any one of the twentieth to thirtieth aspects is configured so that the non-metallic member includes resin. The non-metallic member is attached to the base member via the first alumite layer by a thermal compression bonding process.

With the bicycle component according to the thirty-first aspect, it is possible to provide a bicycle composite component in which the nom-metallic material made of a prepreg material certainly adheres to an aluminum base material.

In accordance with a thirty-second aspect of the present invention, the bicycle component according to any one of the twenty-fourth to thirty-first aspects is configured so that the first alumite layer is provided on the base member in a first area. The second alumite layer provided on the base member in a second area different from the first area.

With the bicycle component according to the thirty-second aspect, the first alumite layer has sufficient electrical insulation property. Thus, it is possible to provide an aluminum base material that allows a colored alumite layer to be able to be formed as the second alumite layer disposed at a different location from the first alumite layer even if the bicycle component is combined with a non-metallic material having electrical conductivity.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
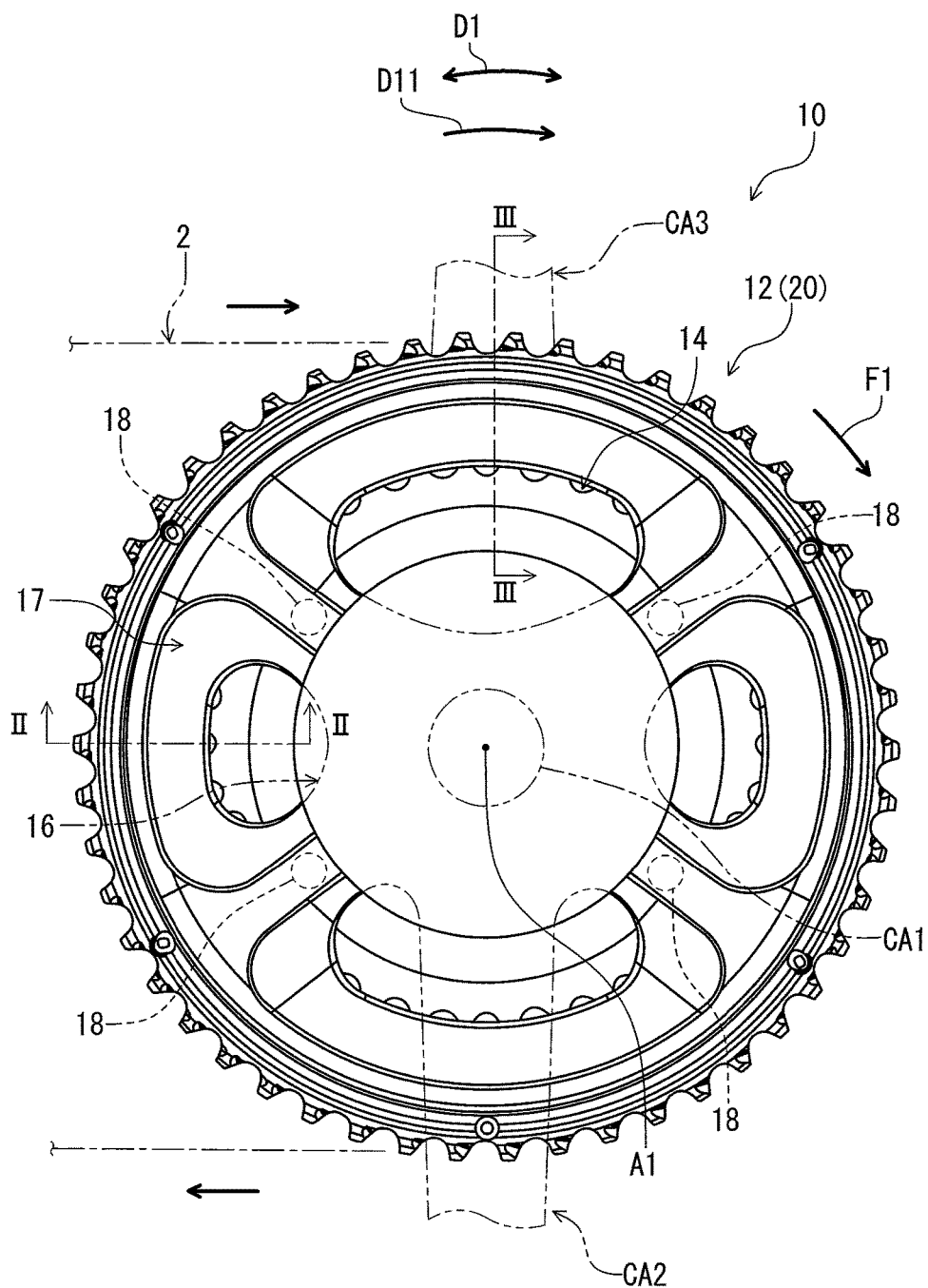
FIG. 1 is a side elevational view of a bicycle crank including a bicycle component (bicycle sprocket) in accordance with an embodiment of the present invention.

The embodiment(s) will now be described with reference to the accompanying drawings, wherein like reference numerals designate corresponding or identical elements throughout the various drawings.

Referring initially to FIG. 1, a bicycle crank 10 includes a bicycle sprocket 12 in accordance with an embodiment of the present invention. The bicycle crank 10 has a rotational center axis A1. The bicycle crank 10 is rotatable about the rotational center axis A1 relative to a bicycle frame (not shown). The bicycle crank 10 is rotatable about the rotational center axis A1 in a rotational driving direction D11 during pedaling. The rotational driving direction D11 is defined along a circumferential direction D1 defined about the rotational center axis A1.

The bicycle sprocket 12 is engaged with a bicycle chain 2 to transmit a rotational driving force F1 to the bicycle chain 2. The bicycle crank 10 includes a bicycle sprocket 14 in addition to the bicycle sprocket 12. The bicycle sprocket 14 is engaged with the bicycle chain 2 to transmit the rotational driving force F1 to the bicycle chain 2. The bicycle sprocket 12 has an outer diameter larger than an outer diameter of the bicycle sprocket 14.

While the bicycle crank 10 includes the bicycle sprockets 12 and 14 in this embodiment, the bicycle crank 10 can comprise additional bicycle sprocket in addition to the bicycle sprockets 12 and 14. Furthermore, one of the bicycle sprockets 12 and 14 can be omitted from the bicycle crank 10. While the bicycle sprockets 12 and 14 are front sprockets in this embodiment, the structure of the bicycle sprockets 12 and 14 can be applied to a rear sprocket.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle crank 10 of the bicycle sprocket 12, should be interpreted relative to the bicycle equipped with the bicycle crank 10 as used in an upright riding position on a horizontal surface.

As seen in FIG. 1, the bicycle crank 10 includes a sprocket mounting member 16, a cover 17, a crank axle CA1, a right crank arm CA2, and a left crank arm CA3. The bicycle sprocket 12 comprises crank attachment portions 18. The crank attachment portions 18 are fastened to the sprocket mounting member 16 by fasteners such as bolts (not shown). The bicycle sprocket 14 are fastened to at least one of the bicycle sprocket 12 and the sprocket mounting member 16 by fasteners such as bolts (not shown). The cover 17 is attached to at least one of the bicycle sprocket 12 and the sprocket mounting member 16.

The right crank arm CA2 and the left crank arm CA3 are secured to the crank axle CA1. The right crank arm CA2 and the left crank arm CA3 are rotatably mounted to the bicycle frame about the rotational center axis A1 via the crank axle CA1. The sprocket mounting member 16 is mounted on the right crank arm CA2 to be rotatable integrally with the right crank arm CA2 about the rotational center axis A1.

Since the bicycle sprockets 12 and 14 have substantially the same structure as each other in this embodiment, the bicycle sprocket 12 will be described in detail below, and the bicycle sprocket 14 will not be described in detail here for the sake of brevity. The bicycle sprockets 12 and 14 can also be referred to as bicycle composite sprockets 12 and 14, respectively.

Figure 2:
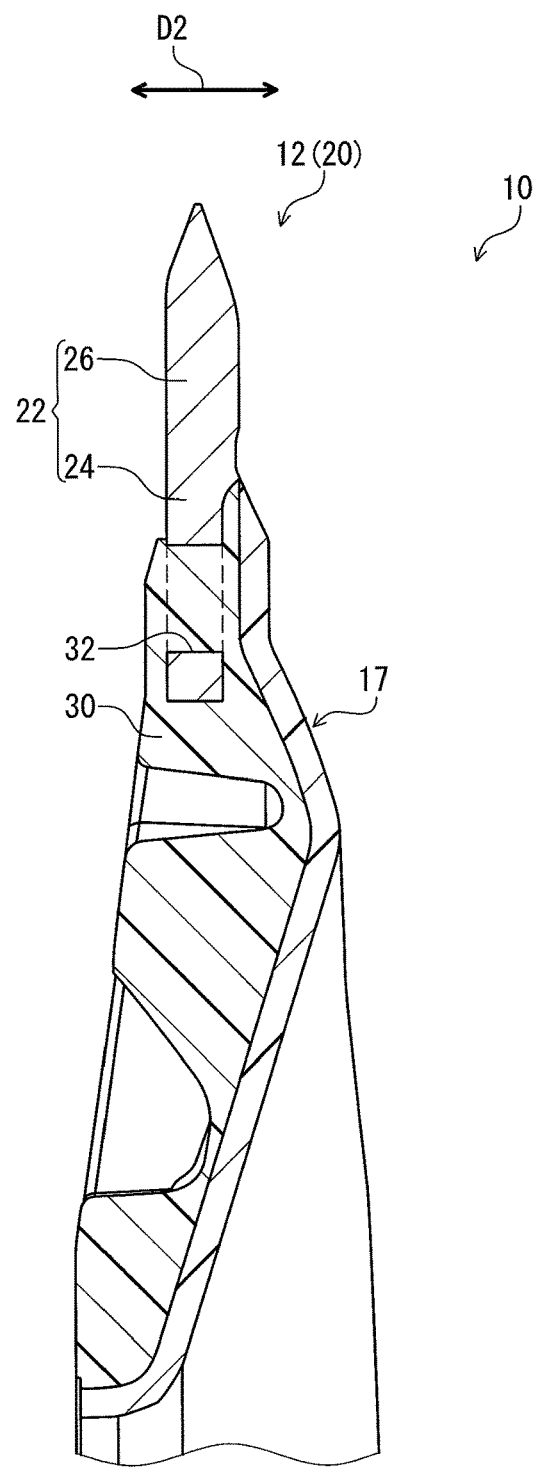
FIG. 2 is a cross-sectional view of the bicycle component taken along line II-II of FIG. 1.
Figure 3:
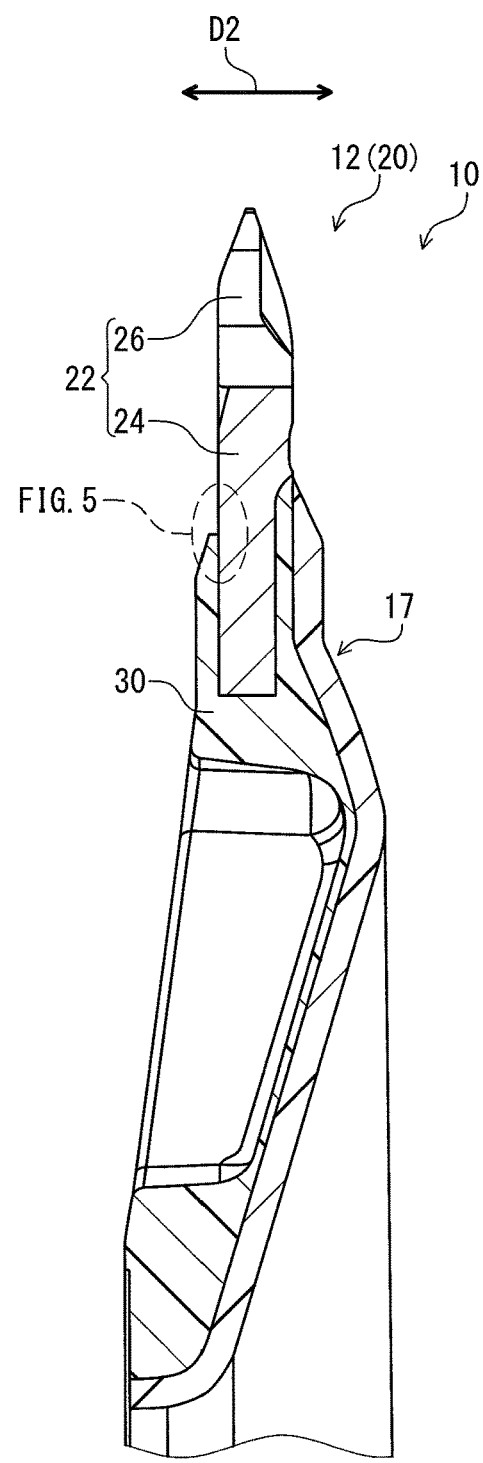
FIG. 3 is a cross-sectional view of the bicycle component taken along line of FIG. 1.

As seen in FIGS. 2 and 3, the bicycle sprocket 12 comprises a bicycle component 20 in accordance with the embodiment of the present invention. Namely, the bicycle composite sprocket 12 comprises the bicycle component 20 in accordance with the embodiment of the present invention. While the bicycle sprocket 12 comprises the bicycle component 20 in this embodiment, the structure of the bicycle component 20 can be applied to other bicycle elements. The bicycle component 20 comprises a base member 22. The base member 22 is made of an aluminum alloy.

Figure 4:
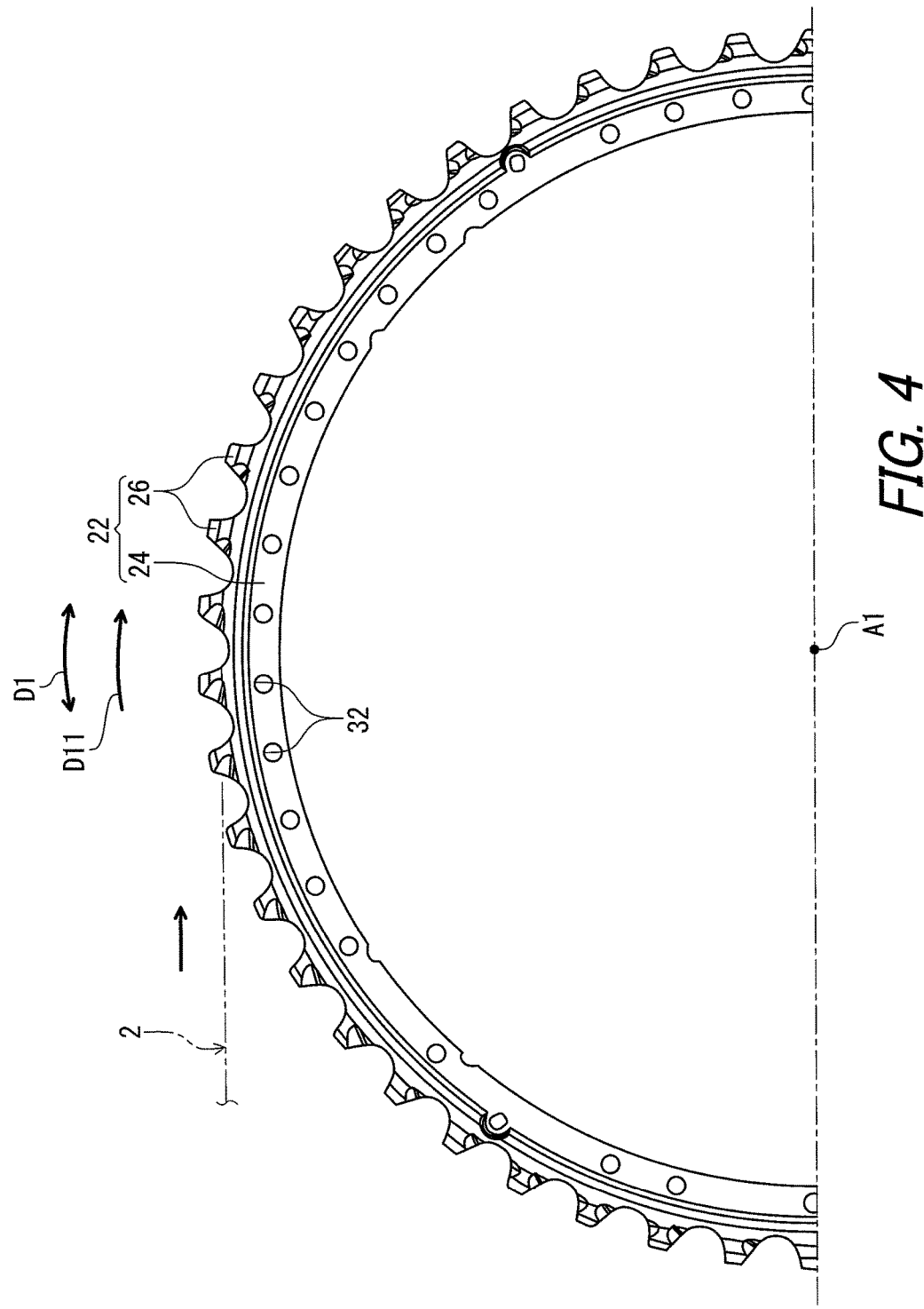
FIG. 4 is a partial side elevational view of a base member of the bicycle component illustrated in FIG. 1.

As seen in FIG. 4, in this embodiment, the base member 22 includes an annular part 24 and a plurality of sprocket teeth 26. The plurality of sprocket teeth 26 are provided on an outer periphery of the annular part 24. The plurality of sprocket teeth 26 are engaged with the bicycle chain 2. The plurality of sprocket teeth 26 are integrally provided with the annular part 24 as a one-piece unitary member.

Figure 5:
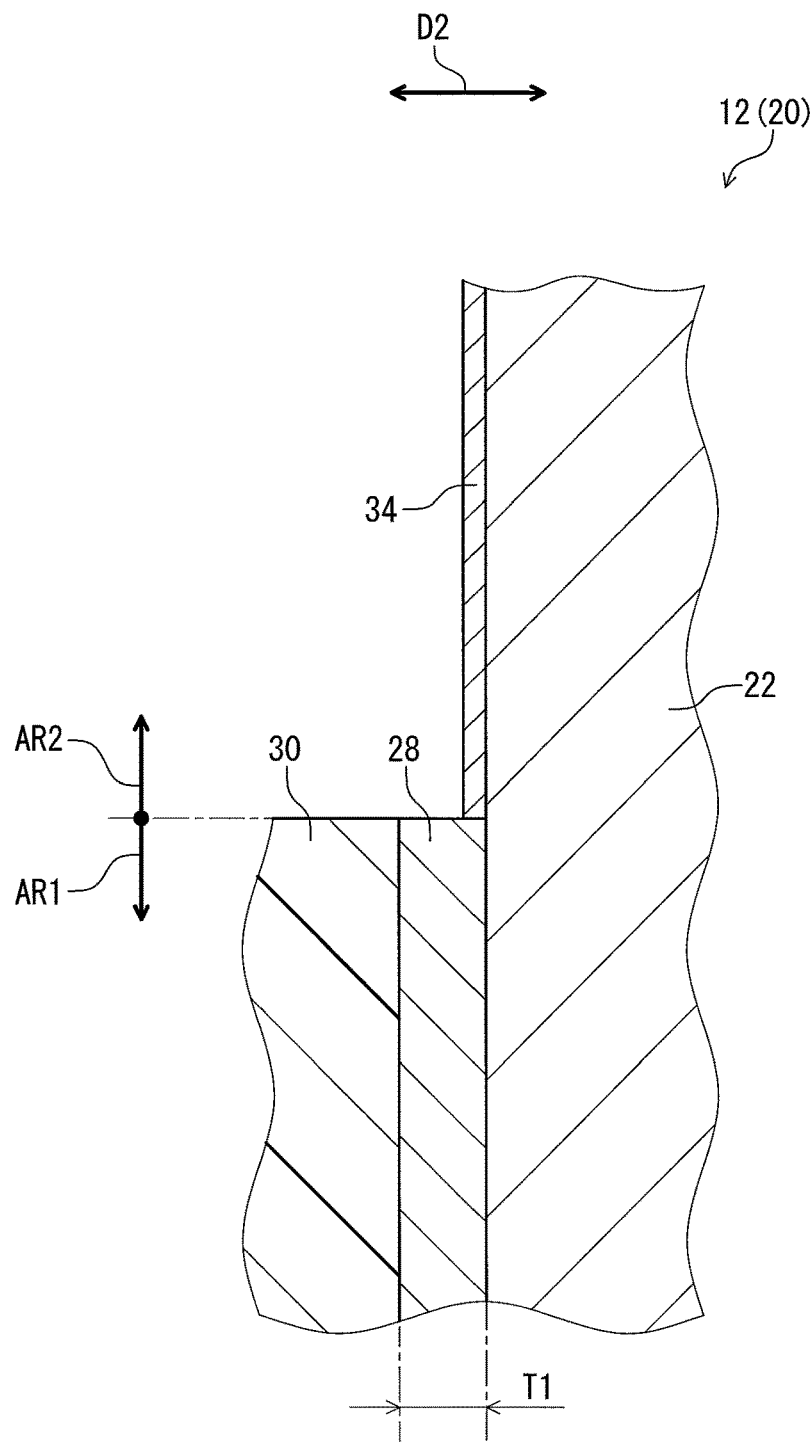
FIG. 5 is a partial cross-sectional view of the bicycle component illustrated in FIG. 3.

As seen in FIG. 5, the bicycle component 20 comprises a first alumite layer 28. The first alumite layer 28 is provided on the base member 22. In this embodiment, the first alumite layer 28 is provided on the annular part 24. The first alumite layer 28 is provided on a part of the annular part 24. The first alumite layer 28 can include a plurality of alumite layers.

The bicycle component 20 further comprises a non-metallic member 30 provided on the first alumite layer 28. The non-metallic member 30 includes resin. The non-metallic member 30 is attached to the base member 22 via the first alumite layer 28 by an integral molding process. In this embodiment, the non-metallic member 30 can be made of a carbon fiber reinforced plastic. The non-metallic member 30 includes a carbon fiber. The carbon fiber is impregnated with the resin to provide the carbon fiber reinforced plastic. The non-metallic member 30 is attached to the first alumite layer 28.

Other process can be used for attachment of the non-metallic member 30 instead of the integral molding process. For example, the non-metallic member 30 can be attached to the base member 22 via the first alumite layer 28 by a thermal compression bonding process. In the thermal compression bonding process, at least one prepreg material is attached to the first alumite layer 28.

The non-metallic member 30 can have electrical conductivity. The non-metallic member 30 can be made of conductive resin. The resin includes the conductive resin. The carbon fiber is impregnated with the conductive resin. Examples of the conductive resin include a conductive epoxy resin.

As seen in FIGS. 2 and 3, the base member 22 is provided in the non-metallic member 30. In this embodiment, the base member 22 is partly provided in the non-metallic member 30. The annular part 24 of the base member 22 is partly embedded in the non-metallic member 30. The base member 22 is embedded in melted resin of the non-metallic member 30 during the integral molding process.

As seen in FIG. 4, the base member 22 includes a plurality of through-holes 32. The through-holes 32 are provided at the annular part 24 of the base member 22. As seen in FIG. 2, the non-metallic member 30 is provided in the through-holes 32. Specifically, the non-metallic member 30 is partly provided in the through-holes 32. The melted resin of the non-metallic member 30 enters into the through-holes 32 during the integral molding process.

Figure 6:
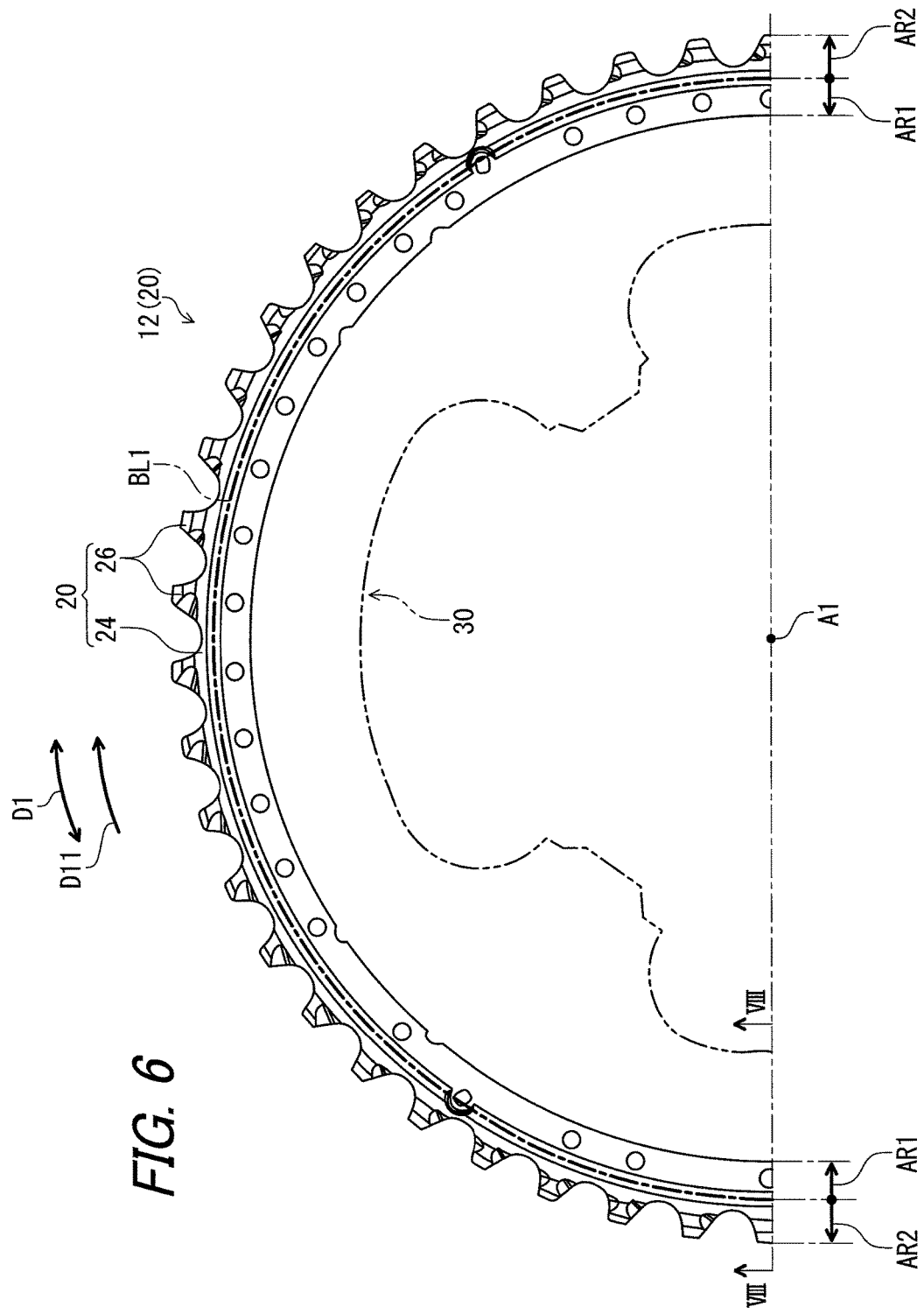
FIG. 6 is a partial side elevational view of the base member of the bicycle component illustrated in FIG. 1.

As seen in FIG. 6, the non-metallic member 30 has an annular shape. The non-metallic member 30 covers the annular part 24 of the base member 22. While the non-metallic member 30 partly covers the annular part 24 of the base member 22 in this embodiment, the non-metallic member 30 can entirely cover the annular part 24 of the base member 22.

As seen in FIG. 5, the bicycle component 20 further comprises a second alumite layer 34 provided on the base member 22. The first alumite layer 28 is provided on the base member 22 in a first area AR1. The second alumite layer 34 is provided on the base member 22 in a second area AR2 different from the first area AR1. In this embodiment, the first alumite layer 28 is not provided in the second area AR2. The second alumite layer 34 is not provided in the first area AR1.

Figure 7:
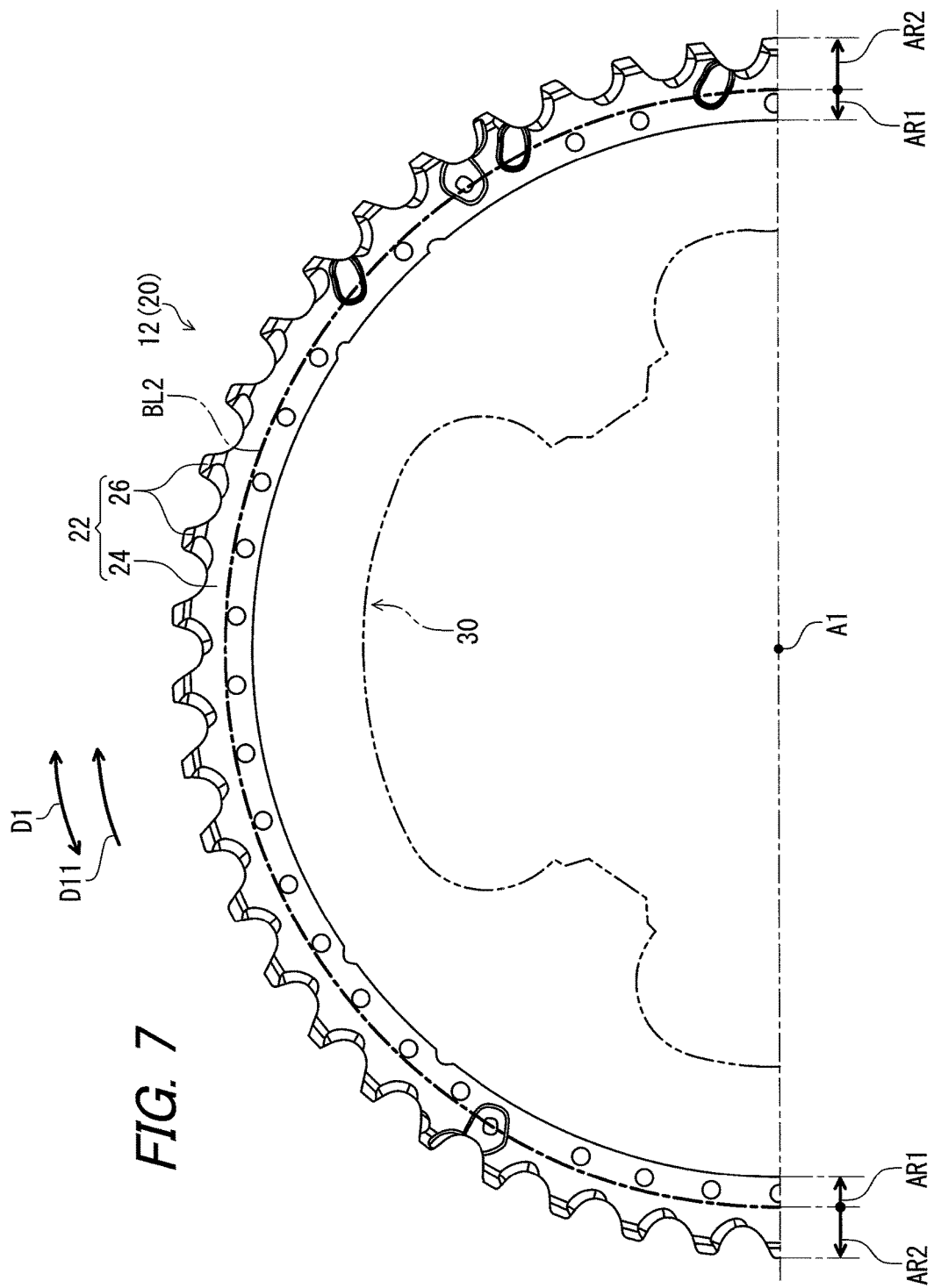
FIG. 7 is a partial side elevational view of the base member of the bicycle component illustrated in FIG. 1.

As seen in FIGS. 6 and 7, the first area AR1 and the second area AR2 are divided by border lines BL1 and BL2. The border lines BL1 and BL2 are circular in this embodiment. The first area AR1 has an annular shape when viewed from an axial direction D2 (FIG. 5) parallel to the rotational center axis A1. The second area AR2 has an annular shape when viewed from the axial direction D2 (FIG. 5). The first area AR1 is provided radially inward of the second area AR2. The first area AR1 is an area in which the base member 22 overlaps with the non-metallic member 30 when viewed from the axial direction D2 (FIG. 5). The second area AR2 is an area in which the base member 22 does not overlap with the non-metallic member 30 when viewed from the axial direction.

Figure 8:
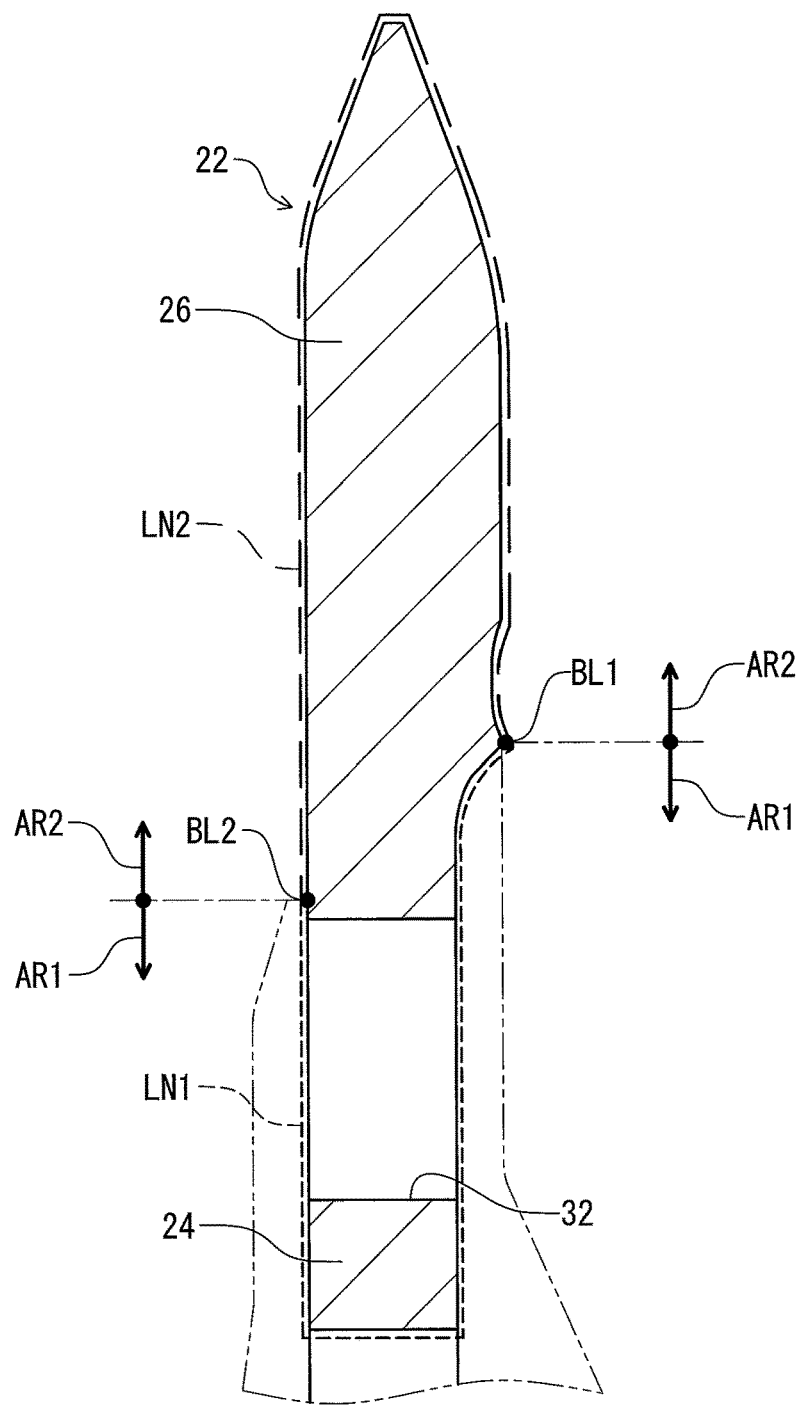
FIG. 8 is a cross-sectional view of the bicycle component taken along line VIII-VIII of FIG. 6.

As seen in FIG. 8, the border lines BL1 is radially offset from the border line BL2. The first area AR1 is indicated with a heavy chain line LN1 in the cross-section depicted in FIG. 8. The second area AR2 is indicated with a heavy broken line LN2 in the cross-section depicted in FIG. 8.

Figure 9:
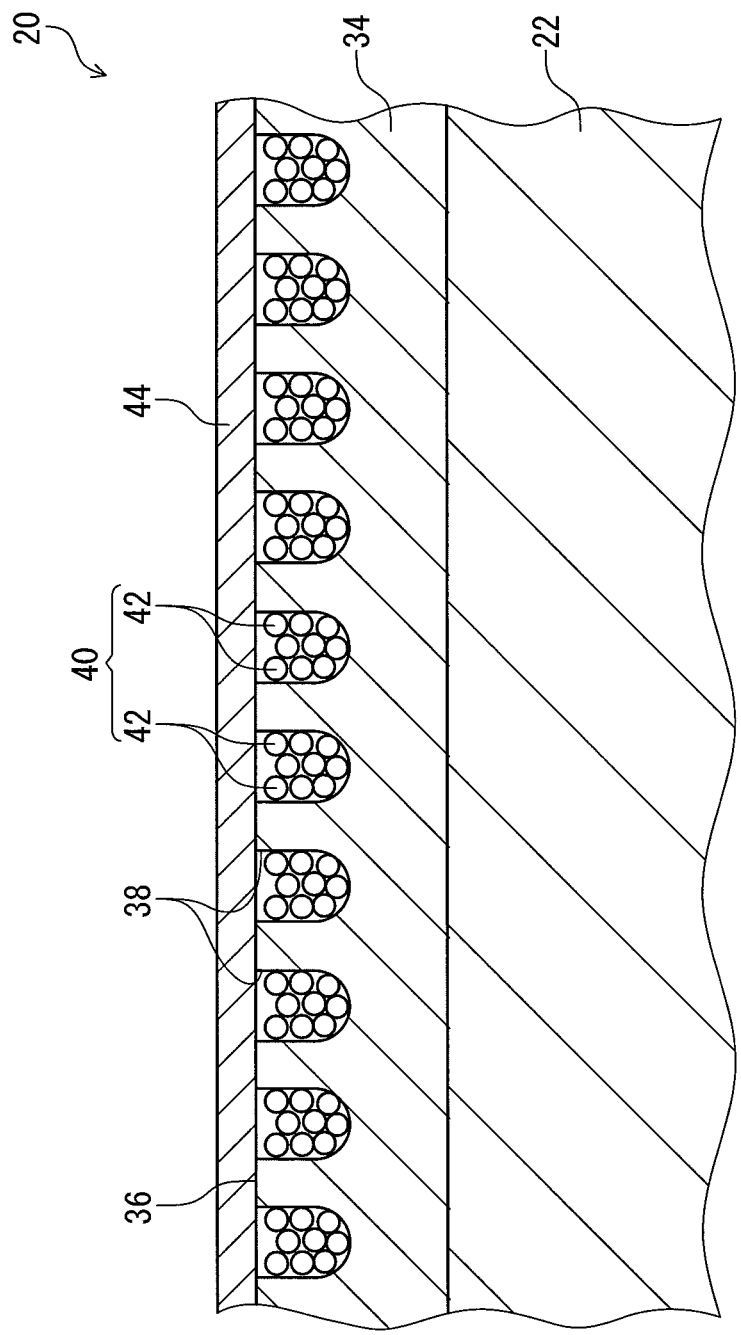
FIG. 9 is an enlarged schematic cross-sectional view of the bicycle component illustrated in FIG. 1.

As seen in FIG. 9, the second alumite layer 34 includes a second surface 36 and pores 38. The pores 38 are provided on the second surface 36. The bicycle component 20 further comprises dye compound 40 fixed to the second alumite layer 34. The dye compound 40 includes dye particles 42. The dye particles 42 of the dye compound 40 are provided in the pores 38 of the second alumite layer 34. The second alumite layer 34 is dyed with the dye compound 40. For example, the dye compound 40 has a color different from a color of the aluminum alloy. In this embodiment, the dye particles 42 have black as the color. However, the color of the dye compound 40 is not limited to this embodiment. The second alumite layer 34 can include a plurality of alumite layers.

The bicycle component 20 further comprises a sealing layer 44 provided on the second alumite layer 34. In this embodiment, the sealing layer 44 is provided on the second surface 36 of the second alumite layer 34 to cover the pores 38. The sealing layer 44 includes nickel hydrate for example. The sealing layer 44 is configured to prevent the dye particles 42 from coming off from the pores 38.

As seen in FIG. 5, the first alumite layer 28 has a thickness T1 that is equal to or larger than 1.0 µm. The thickness T1 of the first alumite layer 28 can be equal to or larger than 2.5 µm. The thickness T1 of the first alumite layer 28 can be equal to or larger than 5.0 µm. The thickness T1 of the first alumite layer 28 can be equal to or larger than 10.0 µm. The thickness T1 of the first alumite layer 28 can be equal to or smaller than 100 µm. The thickness T1 of the first alumite layer 28 can be substantially equal to 1.0 µm. The thickness T1 of the first alumite layer 28 can be substantially equal to 100 µm. Namely, the thickness T1 of the first alumite layer 28 can be in a range from approximately 1.0 µm to approximately 100 µm.

Figure 10:
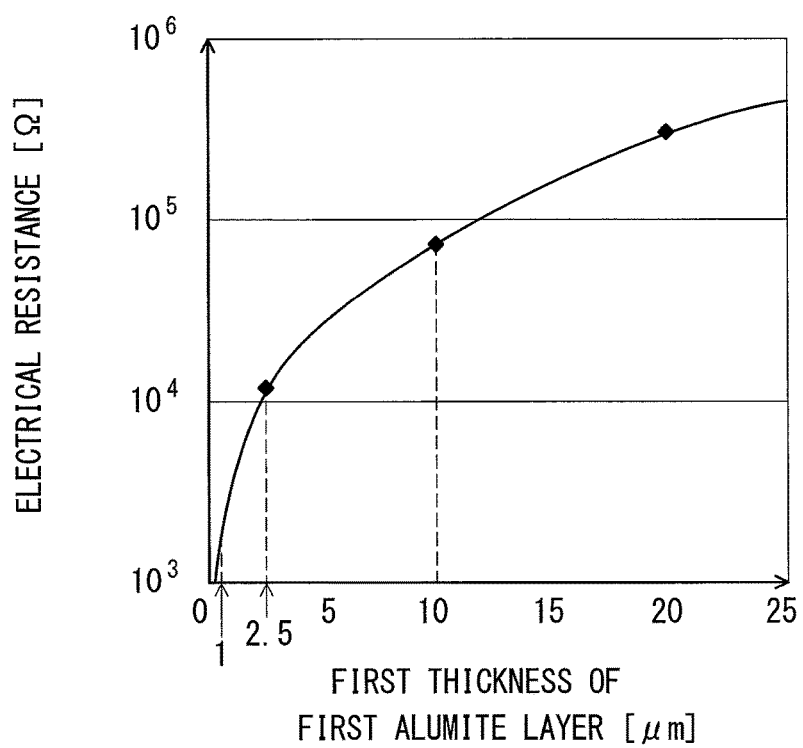
FIG. 10 shows relationship between a thickness of a first alumite layer and electrical resistance of the first alumite layer in the bicycle component illustrated in FIG. 1.

FIG. 10 shows relationship between the thickness T1 of the first alumite layer 28 and the electrical resistance of the first alumite layer 28. As seen in FIG. 10, the larger thickness of the first alumite layer 28 produces the higher electrical resistance of the first alumite layer 28. In this embodiment, the electrical resistance of the first alumite layer 28 is substantially equal to or higher than $10^3 \Omega$ when the thickness T1 is equal to 1.0 µm. The electrical resistance of the first alumite layer 28 is substantially equal to or higher than $10^4 \Omega$ when the thickness T1 is equal to 2.5 µm. The electrical resistance of the first alumite layer 28 is substantially equal to $10^5 \Omega$ when the thickness T1 is equal to 10 µm.

Namely, in this embodiment, the first alumite layer 28 has electrical resistance that is equal to or higher than $10^3 \Omega$. The electrical resistance of the first alumite layer 28 is equal to or higher than $10^4 \Omega$. The electrical resistance of the first alumite layer 28 is equal to or higher than $10^5 \Omega$. The electrical resistance of the first alumite layer 28 can be substantially equal to $10^3 \Omega$. The electrical resistance of the first alumite layer 28 can be substantially equal to $10^4 \Omega$. The electrical resistance of the first alumite layer 28 can be substantially equal to $10^5 \Omega$.

Furthermore, the non-metallic member 30 can have electrical resistance lower than the electrical resistance of the first alumite layer 28 because the first alumite layer 28 has sufficient electrical resistance.

A method of manufacturing the bicycle component 20 will be described in detail below referring to FIGS. 11 to 20.

Figure 11:
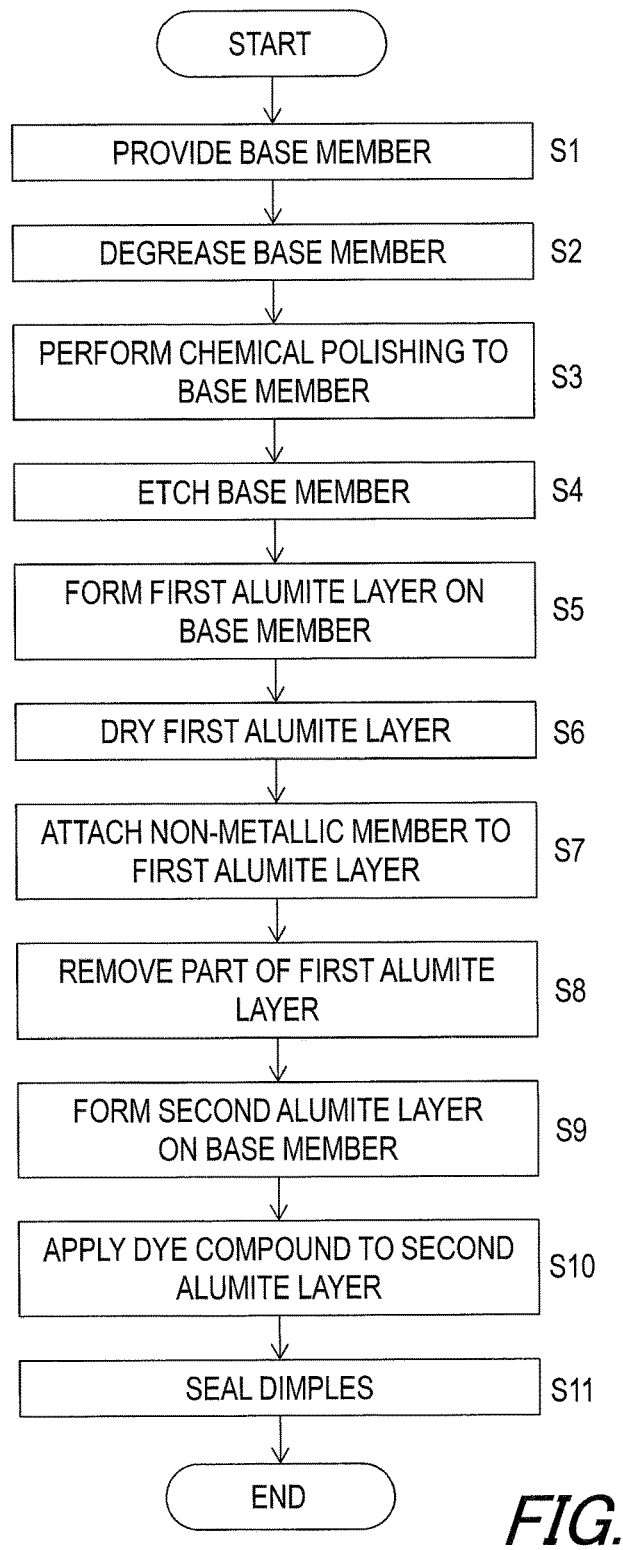
FIG. 11 shows a flowchart of a method of manufacturing the bicycle component illustrated in FIG. 1.
Figure 12:
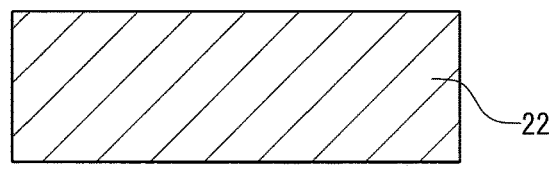
FIGS. 12 to 20 are schematic cross-sectional views showing steps of the method of manufacturing the bicycle component illustrated in FIG. 1.

As seen in FIGS. 11 and 12, the method of manufacturing the bicycle component 20 comprises providing the base member 22 made of the aluminum alloy (step S1). For example, the base member 22 is provided via one of casting, forging, and press working.

As seen in FIG. 11, the method of manufacturing the bicycle component 20 comprises degreasing the base member 22 (step S2). For example, the degreasing of the base member 22 includes putting the base member 22 in a degreasing agent for approximately 1 min under a temperature of approximately 60° C. The degreasing agent includes phosphate. The degreasing agent can include a surface acting agent in addition to phosphate.

The method of manufacturing the bicycle component 20 comprises performing chemical polishing on the base member 22 (step S3). For example, the performing of the chemical polishing includes putting the base member 22 in a chemical-polishing agent for approximately 30 min under a temperature of approximately 90° C.

The method of manufacturing the bicycle component 20 comprises forming pores (recesses) on the base member 22 after the performing of the chemical polishing (step S4). For example, the forming of the pores includes etching the base member 22 to from the pores on the base member 22 after the performing of the chemical polishing. The forming of the pores can include applying laser to the base member 22 to form the pores instead of or in addition to the etching.

As seen in FIGS. 11 to 14, the method of manufacturing the bicycle component 20 comprises forming the first alumite layer 28 having the thickness T1 on the base member 22 (step S5). The forming of the first alumite layer 28 includes forming the first alumite layer 28 on the base member 22 etched in the etching of the base member 22. For example, the forming of the first alumite layer 28 includes anodizing the base member 22 to form the first alumite layer 28 on the base member 22.

Figure 13:
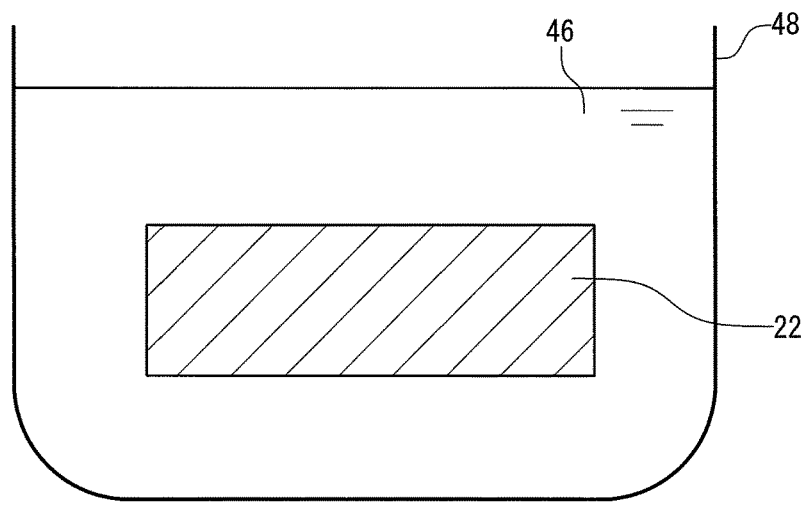
Figure 14:
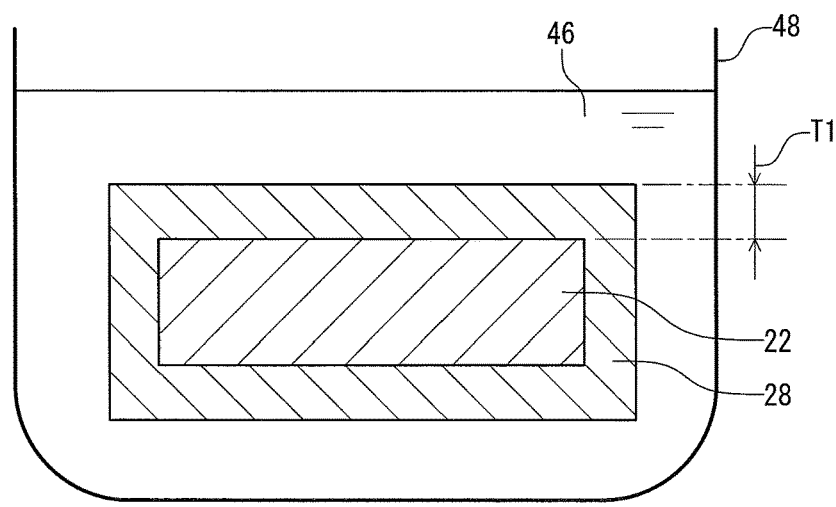

As seen in FIG. 13, the forming of the first alumite layer 28 includes putting the base member 22 in an electrolyte solution 46 provided in an electrolytic cell 48. The forming of the first alumite layer 28 includes connecting an anode electrode (not shown) to the base member 22. The forming of the first alumite layer 28 includes putting a cathode electrode (not shown) in the electrolyte solution. The forming of the first alumite layer 28 includes applying a voltage to the anode electrode to anodize the base member 22. Thus, as seen in FIG. 14, the first alumite layer 28 is formed on the base member 22.

As seen in FIG. 11, the method of manufacturing the bicycle component 20 comprises drying the first alumite layer 28 (step S6). For example, the drying of the first alumite layer 28 includes heating the first alumite layer 28 to dry the first alumite layer 28 after the forming of the first alumite layer 28. The heating of the first alumite layer 28 includes heating the base member 22 and the first alumite layer 28 for approximately 30 min under a temperature of approximately 140° C. in a batch furnace. The base member 22 and the first alumite layer 28 are then cooled under a room temperature.

Figure 15:
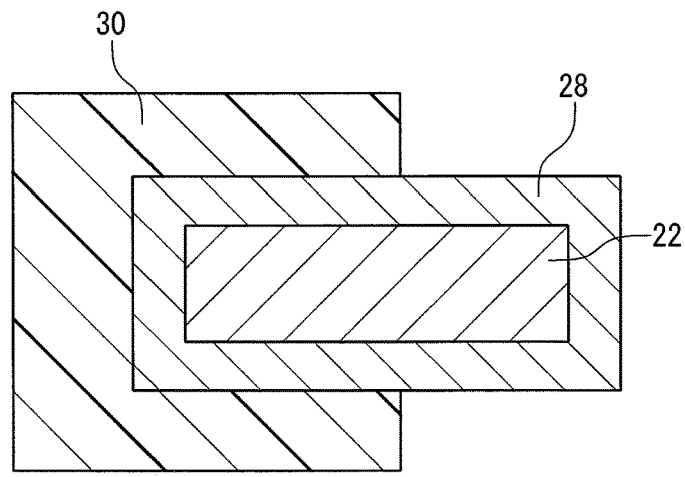

As seen in FIGS. 11 and 15, the method of manufacturing the bicycle component 20 comprises attaching the non-metallic member 30 to the first alumite layer 28 (step S7). For example, the attaching of the non-metallic member 30 includes forming the carbon fiber reinforced plastic as the non-metallic member 30 on the first alumite layer 28. The non-metallic member 30 adheres to the first alumite layer 28 via the resin of the carbon fiber reinforced plastic.

Figure 16:
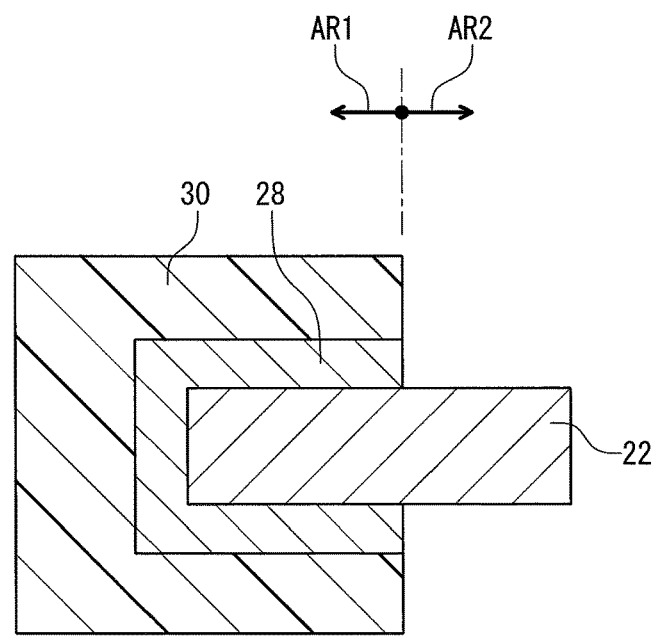

As seen in FIGS. 11 and 16, the method of manufacturing the bicycle component 20 comprises removing a part of the first alumite layer 28 from the base member 22 (step S8). For example, the removing of the part of the first alumite layer 28 includes removing the part of the first alumite layer 28 from the second area AR2 of the base member 22.

Figure 17:
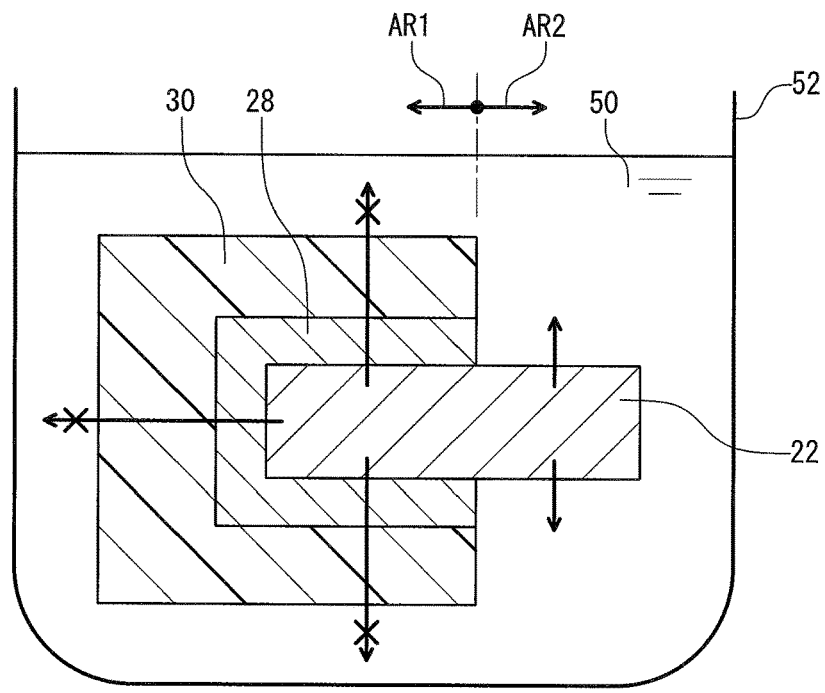
Figure 18:
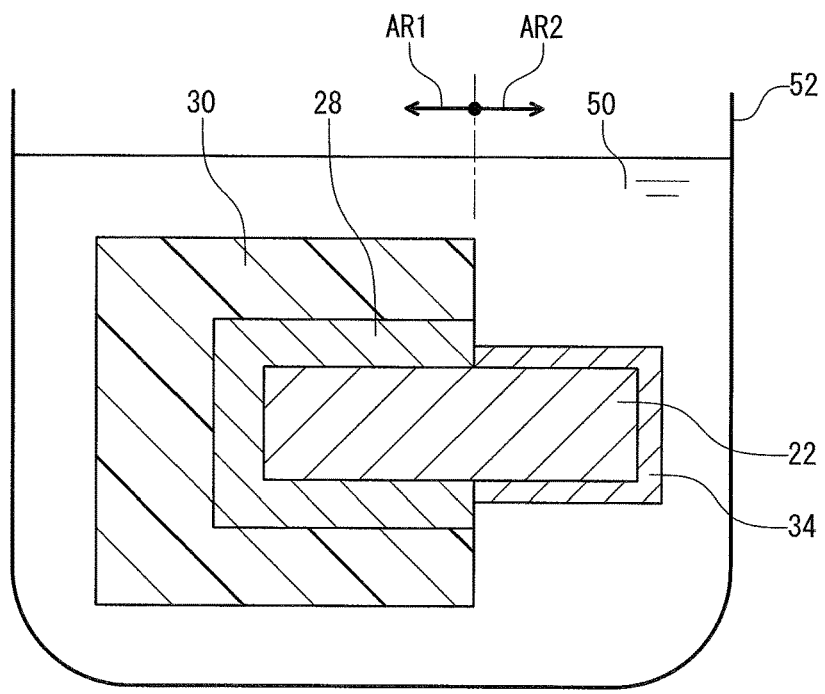

As seen in FIGS. 11, 17, and 18, the method of manufacturing the bicycle component 20 comprises forming the second alumite layer 34 on the base member 22 (step S9). For example, the forming of the second alumite layer 34 includes forming the second alumite layer 34 on the base member 22 in the second area AR2. The forming of the second alumite layer 34 includes anodizing the base member 22 to form the second alumite layer 34 on the base member 22.

As seen in FIG. 17, the forming of the second alumite layer 34 includes putting the base member 22 in an electrolyte solution 50 provided in an electrolytic cell 52. The forming of the second alumite layer 34 includes connecting an anode electrode (not shown) to the base member 22. The forming of the second alumite layer 34 includes putting a cathode electrode (not shown) in the electrolyte solution 50. The forming of the second alumite layer 34 includes applying a voltage to the anode electrode to anodize the base member 22. Thus, as seen in FIG. 18, the second alumite layer 34 is formed on the base member 22.

In the forming of the second alumite layer 34, the voltage applied to the base member 22 creates flow of current between the base member 22 and the electrolyte solution 50. The non-metallic member 30 has electrical conductivity. Accordingly, if the first alumite layer 28 has electrical resistance which is lower than the electrical resistance of the second alumite layer 34, the current flows via the first alumite layer 28 and the non-metallic member 30 without via the second area AR2. This inhibits forming effectively the second alumite layer 34.

In this embodiment, however, since the first alumite layer 28 has the electrical resistance that is equal to or higher than $10^3 \Omega$, the first alumite layer 28 prevents the current from flowing via the first alumite layer 28 during anodizing due to such sufficient electrical resistance of the first alumite layer. Accordingly, as seen in FIG. 18, it is possible to effectively form the second alumite layer 34 on the base member 22 in the second area AR2.

Figure 19:
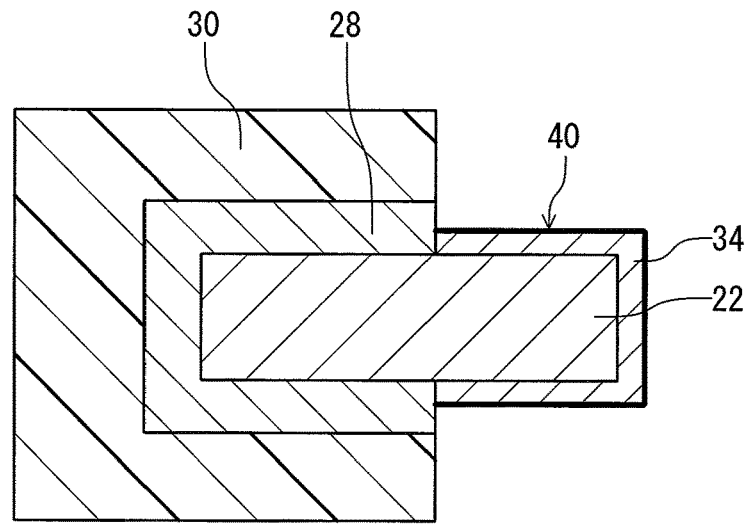

As seen in FIGS. 11 and 19, the method of manufacturing the bicycle component 20 comprises applying the dye compound 40 to the second alumite layer 34 (step S10). For example, the applying of the dye compound 40 includes immersing the base member 22 with the second alumite layer 34 in a dye solution including the dye compound 40. The second alumite layer 34 includes the pores 38 (FIG. 9) on the second surface 36 of the second alumite layer 34. The dye particles 42 of the dye compound 40 enter into the pores 38.

Figure 20:
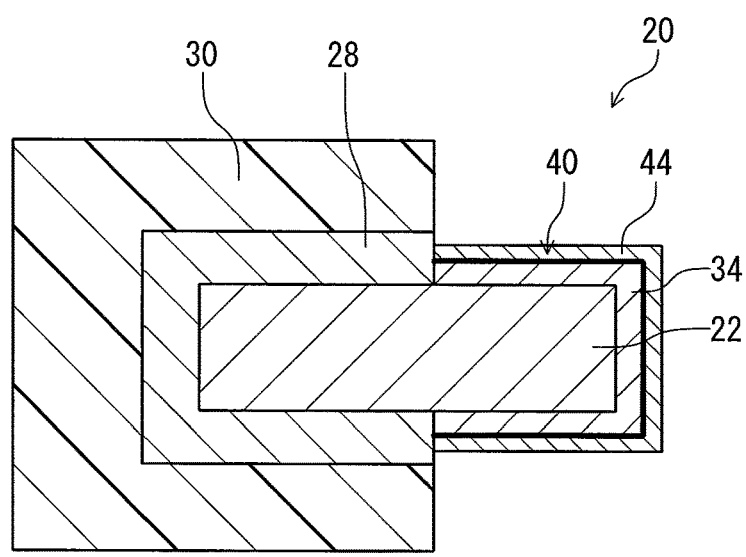

As seen in FIGS. 11 and 20, the method of manufacturing the bicycle component 20 comprises sealing the pores 38 (FIG. 9) with the sealing layer 44 to fix the dye compound 40 in the second alumite layer 34 (step S11). For example, the sealing of the pores includes putting the base member 22 with the second alumite layer 34 in a sealing solution including the sealing material. The sealing material includes nickel hydrate. The sealing material covers the pores of the second alumite layer 34. The bicycle component 20 is washed with water to remove the remaining sealing solution from the second alumite layer 34 or other part of the bicycle component 20. Thus, it is possible to manufacture the bicycle component 20.

The bicycle component 20 includes the following features.

(1) With the bicycle component 20, the first alumite layer 28 is provided on the base member 22. The first alumite layer 28 has the thickness T1 that is equal to or larger than 1.0 μm. Accordingly, it is possible to give sufficient electrical insulation property to the first alumite layer 28. Thus, it is possible to provide the bicycle component 20 on which a colored alumite layer can be formed even if the bicycle component 20 is combined with a non-metallic material having electrical conductivity.

(2) Since the thickness of the first alumite layer 28 is equal to or larger than 2.5 μm, it is possible to further improve the electrical insulation property of the first alumite layer 28. This allows the colored alumite layer to be more easily formed on the bicycle component 20.

(3) Since the thickness of the first alumite layer 28 is equal to or larger than 5.0 μm, it is possible to further improve the electrical insulation property of the first alumite layer 28. This allows the colored alumite layer to be more easily formed on the bicycle component 20

(4) Since the thickness of the first alumite layer 28 is equal to or larger than 10.0 μm, it is possible to further improve the electrical insulation property of the first alumite layer 28. This allows the colored alumite layer to be more easily formed on the bicycle component 20.

(5) The bicycle component 20 further comprises the non-metallic member 30 provided on the first alumite layer 28. Accordingly, it is possible to provide a bicycle composite component including the aluminum alloy and the non-metallic material while the colored alumite layer can be sufficiently formed on the bicycle component 20.

(6) The non-metallic member 30 has electrical conductivity. Accordingly, it is possible to provide a bicycle composite component including the aluminum alloy and the non-metallic material having the electrical conductivity while the colored alumite layer can be sufficiently formed on the bicycle component 20.

(7) The non-metallic member 30 is made of the carbon fiber reinforced plastic. Accordingly, it is possible to provide a bicycle composite component including the aluminum alloy and the light carbon fiber reinforced plastic having high mechanical strength while the colored alumite layer can be sufficiently formed on the bicycle component 20.

(8) The non-metallic member 30 is made of conductive resin. Accordingly, it is possible to provide a bicycle composite component including the aluminum alloy and the non-metallic member 30 made of conductive resin while the colored alumite layer can be sufficiently formed on the bicycle component 20.

(9) The bicycle component 20 further comprises the second alumite layer 34 provided on the base member 22. Accordingly, it is possible to provide a bicycle composite component including the second alumite layer 34 used as a colored alumite layer in addition to the first alumite layer 28 having electrical insulation property.

(10) The bicycle component 20 further comprises the dye compound 40 fixed to the second alumite layer 34. Accordingly, it is possible to provide a bicycle composite component including the second alumite layer 34 dyed with the dye compound 40 in addition to the first alumite layer 28 having electrical insulation property.

(11) Since the bicycle sprocket 12 comprises the bicycle component 20, it is possible to give sufficient electrical insulation property to the first alumite layer 28. Thus, it is possible to provide the bicycle sprocket 12 on which a colored alumite layer can be formed even if the bicycle component 20 is combined with a non-metallic material having electrical conductivity.

(12) Since the bicycle composite sprocket 12 comprise the bicycle component 20, it is possible to give sufficient electrical insulation property to the first alumite layer 28. Thus, it is possible to provide the bicycle composite sprocket on which a colored alumite layer can be formed even if the bicycle component 20 is combined with a non-metallic material having electrical conductivity.

(13) The non-metallic member 30 is attached to the base member 22 via the first alumite layer 28 by the integral molding process. The integral molding process improves productivity of the bicycle component 20. Thus, it is possible to provide a bicycle composite component which is preferable for a high-volume production and in which the non-metallic member 30 certainly adheres to an aluminum base material.

(14) The non-metallic member 30 is attached to the base member 22 via the first alumite layer 28 by the thermal compression bonding process. Accordingly, it is possible to provide a bicycle composite component in which the nonmetallic material made of a prepreg material certainly adheres to an aluminum base material.

(15) With the bicycle component 20, the first alumite layer 28 is provided on the base member 22. The first alumite layer 28 has electrical resistance that is equal to or higher than $10^3\Omega$. Because of the first alumite layer 28 having the high electrical resistance, it is possible to provide an aluminum base material on which a colored alumite layer can be formed even if the bicycle component 20 is combined with a non-metallic material having electrical conductivity.

(16) Since the electrical resistance of the first alumite layer 28 is equal to or higher than $10^4\Omega$, it is possible to further improve the electrical insulation property of the first alumite layer 28. This allows the colored alumite layer to be more easily formed on the bicycle component 20.

(17) Since the electrical resistance of the first alumite layer 28 is equal to or higher than $10^5\Omega$, it is possible to further improve the electrical insulation property of the first alumite layer 28. This allows the colored alumite layer to be more easily formed on the bicycle component 20.

(18) The non-metallic member 30 has electrical resistance lower than the electrical resistance of the first alumite layer 28. Because of the first alumite layer 28 having the electrical resistance higher than the electrical resistance of the nonmetallic material, it is possible to provide an aluminum base material on which a colored alumite layer can be formed even if the bicycle component 20 is combined with a non-metallic material having electrical conductivity.

(19) Since the bicycle sprocket 12 comprises the bicycle component 20, because of the first alumite layer 28 having the high electrical resistance, it is possible to provide a bicycle sprocket including an aluminum base material on which a colored alumite layer can be formed even if the bicycle component 20 is combined with a non-metallic material having electrical conductivity.

(20) Since the bicycle composite sprocket 12 comprises the bicycle component 20, because of the first alumite layer 28 having the high electrical resistance, it is possible to provide the bicycle composite sprocket 12 including a composite material on which a colored alumite layer can be formed even if the bicycle component 20 is combined with a non-metallic material having electrical conductivity.

(21) With the bicycle component 20, the first alumite layer 28 is provided on the base member 22 in the first area AR1. The second alumite layer 34 is provided on the base member 22 in the second area AR2 different from the first area AR1. The first alumite layer 28 has sufficient electrical insulation property. Thus, it is possible to provide an aluminum base material that allows a colored alumite layer to be able to be formed as the second alumite layer 34 disposed at a different location from the first alumite layer 28 even if the bicycle component 20 is combined with a non-metallic material having electrical conductivity.

Figure 21:
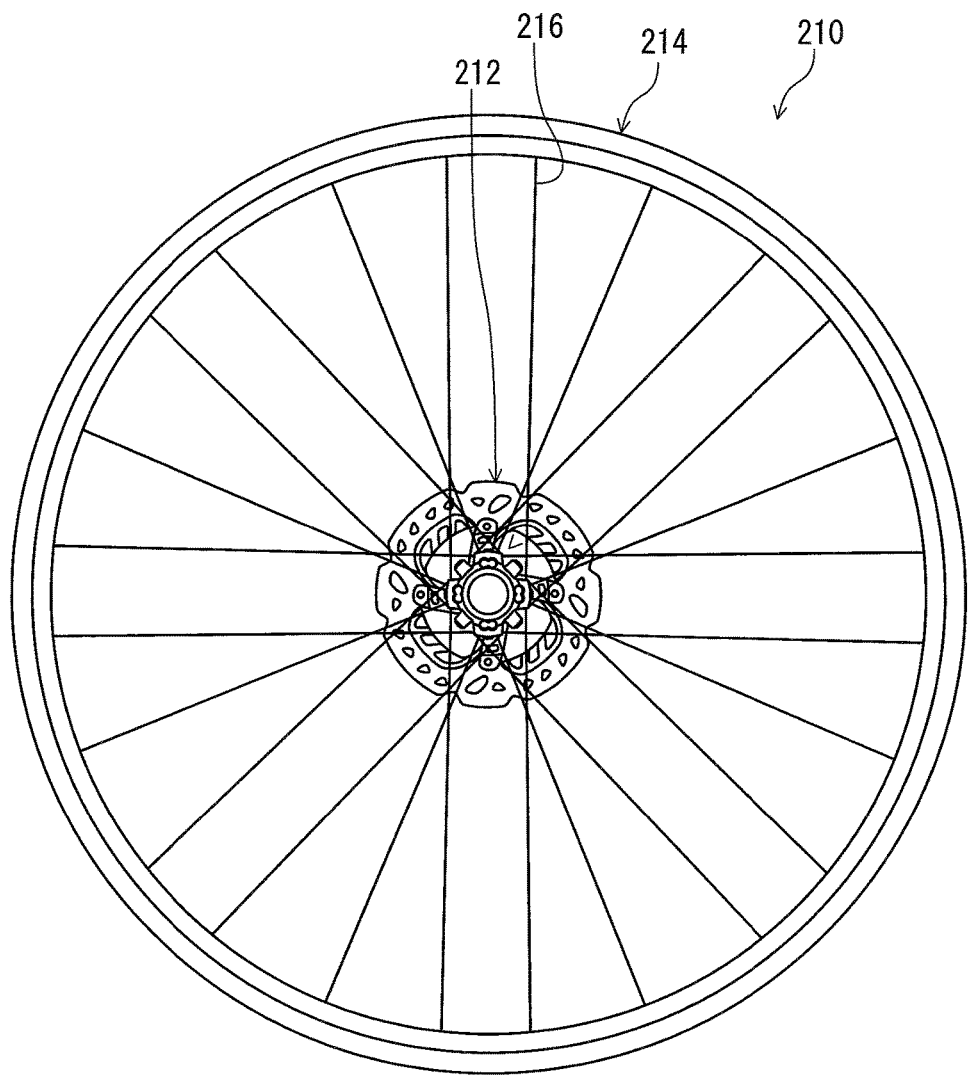
FIG. 21 is a side elevational view of a bicycle wheel including a bicycle component in accordance with another embodiment of the present invention.
Figure 22:
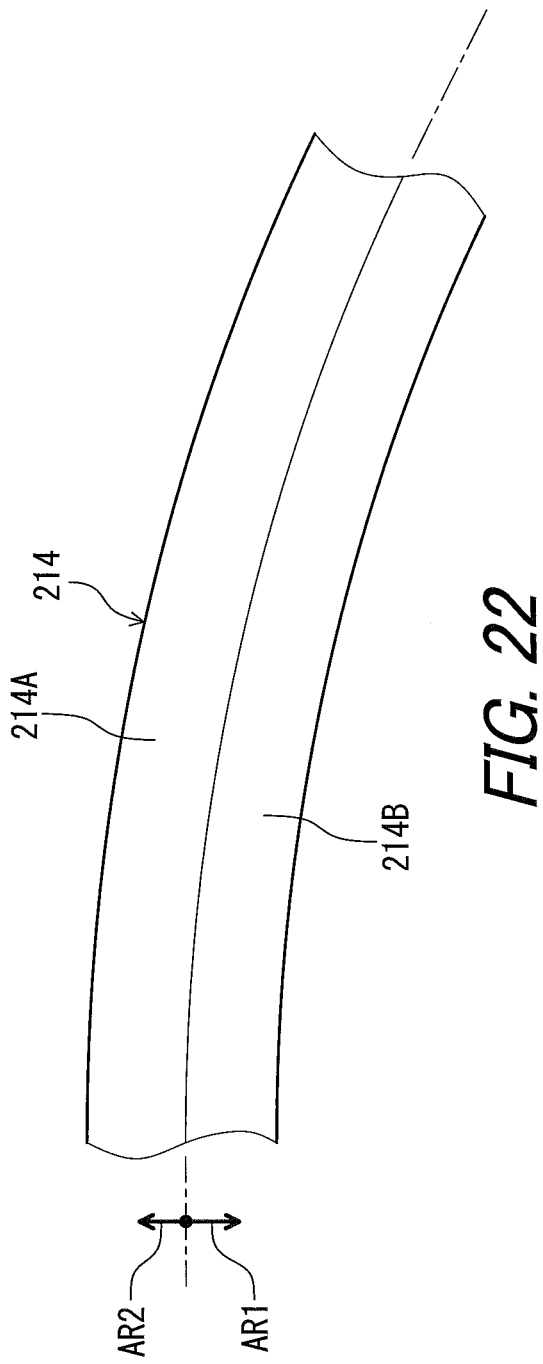
FIG. 22 is a partial enlarged view of a rim of the bicycle wheel illustrated in FIG. 21.

The structure of the bicycle component 20 can be applied to other bicycle elements. For example, as seen in FIG. 21, the structure of the bicycle component 20 can be applied to a bicycle wheel 210. The bicycle wheel 210 comprises the bicycle component 20. Specifically, the bicycle wheel 210 includes a bicycle hub assembly 212, a rim 214, and spokes 216. The rim 214 is coupled to the bicycle hub assembly 212 by the spokes 216. As seen in FIG. 22, the rim 214 includes a sliding part 214A and a coupling part 214B. The sliding part 214A is slidable with brake pads (not shown) of a bicycle brake. The coupling part 214B is coupled to the spokes 216 and is disposed radially inward of the sliding part 214A. The first area AR1 and the second area AR2 are defined on the rim 214. The first area AR1 is defined on the coupling part 214B. The second area AR2 is defined on the sliding part 214A. The first area AR1 is disposed radially inward of the second area AR2. The rim 214 of the bicycle wheel 210 comprises a base member made of aluminum, a first aluminate layer provided on the base member, a second aluminate layer provided on the base member, and a non-metallic member provided on the first aluminate layer. The first alumite layer is provided on the base member in the first area AR1. The second alumite layer is provided on the base member in the second area AR2 that is different from the first area AR1. The non-metallic member is provided on the base member in the first area AR1, and is made of a carbon-reinforced plastic in the illustrated embodiment. The non-metallic material, the first alumite layer and a part of the base member constitute the coupling part 214B. The second alumite layer and another part of the base member constitute the sliding part 214A.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein. For example, the bicycle component of the present invention can be applied to other bicycle elements.

What is claimed is:

1. A bicycle component comprising:
   a base member made of an aluminum alloy, the base member having a first area and a second area different from the first area;
   a first alumite layer provided on the base member; and
   a non-metallic member provided on the first alumite layer,
   wherein the first alumite layer has a thickness that is equal to or larger than 2.5 µm,
   wherein the first alumite layer is provided on the base member in a first area and the second area is free from the first alumite layer, and
   wherein the non-metallic member has electrical conductivity.

2. The bicycle component according to claim 1, wherein the thickness of the first alumite layer is equal to or larger than 5.0 µm.

3. The bicycle component according to claim 1, wherein the thickness of the first alumite layer is equal to or larger than 10.0 µm.

4. The bicycle component according to claim 1, wherein the non-metallic member is made of a carbon fiber reinforced plastic.

5. The bicycle component according to claim 1, wherein the non-metallic member is made of conductive resin.

6. The bicycle component according to claim 1, further comprising:
   a second alumite layer provided on the base member.

7. The bicycle component according to claim 6, further comprising:
   dye compound fixed to the second alumite layer.

8. A bicycle sprocket comprising:
   the bicycle component according to claim 1.

9. The bicycle component according to claim 1, wherein the non-metallic member includes resin; and
   the non-metallic member is attached to the base member via the first alumite layer by an integral molding process.

10. The bicycle component according to claim 4, wherein the non-metallic member includes resin; and
   the non-metallic member is attached to the base member via the first alumite layer by a thermal compression bonding process.

11. The bicycle component according to claim 6, wherein
   the first alumite layer is provided on the base member in the first area; and
   the second alumite layer provided on the base member in the second area different from the first area.

12. The bicycle component according to claim 11, wherein
   the first alumite layer is not provided on the base member in the second area; and
   the second alumite layer is not provided on the base member in the first area.

13. The bicycle component according to claim 1, further comprising:
   a second alumite layer provided in the second area, wherein
   the first alumite layer and the second alumite layer both consisting of an anodized aluminum alloy material.

14. The bicycle component according to claim 1, further comprising:
   a second alumite layer provided in the second area, wherein
   the first alumite layer is a first anodized aluminum alloy layer, the second alumite layer is a second anodized aluminum alloy layer, and the first anodized aluminum alloy layer having a same composition as the second anodized aluminum alloy layer.

15. A bicycle composite sprocket comprising:
   the bicycle component according to claim 1.

16. A bicycle wheel comprising:
   the bicycle component according to claim 1.

17. A bicycle component comprising:
   a base member made of an aluminum alloy, the base member having a first area and a second area different from the first area;
   a first alumite layer provided on the base member in the first area and the second area is free from the first alumite layer, the first alumite layer having electrical resistance that is equal to or higher than $10^3 \Omega$;
   a non-metallic member provided on the first alumite layer, the non-metallic member having electrical conductivity; and
   a second alumite layer provided on base member in the second area.

18. The bicycle component according to claim 17, wherein
   the electrical resistance of the first alumite layer is equal to or higher than $10^4 \Omega$.

19. The bicycle component according to claim 17, wherein
   the electrical resistance of the first alumite layer is equal to or higher than $10^5 \Omega$.

20. The bicycle component according to claim 17, wherein
   the non-metallic member is made of a carbon fiber reinforced plastic.

21. The bicycle component according to claim 17, wherein
   the non-metallic member is made of conductive resin.

22. The bicycle component according to claim 17, further comprising:
   dye compound fixed to the second alumite layer.

23. The bicycle component according to claim 17, wherein
   the non-metallic member has electrical resistance lower than the electrical resistance of the first alumite layer.

24. The bicycle component according to claim 17, wherein
the non-metallic member includes resin, and
the non-metallic member is attached to the base member via the first alumite layer by an integral molding process.

25. The bicycle component according to claim 17, wherein
the non-metallic member includes resin, and
the non-metallic member is attached to the base member via the first alumite layer by a thermal compression bonding process.

26. A bicycle sprocket comprising:
the bicycle component according to claim 17.

27. A bicycle composite sprocket comprising:
the bicycle component according to claim 17.

28. A bicycle wheel comprising:
the bicycle component according to claim 17.

29. A bicycle component comprising:
a base member made of an aluminum alloy, the base member having a first area and a second area different from the first area;
a first alumite layer provided on the base member in the first area and the second area is free from the first alumite layer, the first alumite layer having a thickness that is equal to or larger than 1.0 μm;
a non-metallic member provided on the first alumite layer, the non-metallic member having electrical conductivity; and
a second alumite layer provided on the base member in the second area.

30. The bicycle component according to claim 29, further comprising:
dye compound fixed to the second alumite layer.

* * * * *